United States Patent
Reinartz et al.

(10) Patent No.: US 6,176,692 B1
(45) Date of Patent: Jan. 23, 2001

(54) PUMP, IN PARTICULAR FOR AN HYDRAULIC WHEEL-SLIP BRAKE CONTROL SYSTEM

(75) Inventors: Hans-Dieter Reinartz, Frankfurt; Dieter Dinkel, Eppstein/Ts.; Albrecht Otto, Schöneck, all of (DE); Joachim Böing, Lake Orion, MI (US)

(73) Assignee: Continental Teves AG & Co. OHG (DE)

( * ) Notice: Under 35 U.S.C. 154(b), the term of this patent shall be extended for 0 days.

(21) Appl. No.: 09/331,482

(22) PCT Filed: Nov. 29, 1997

(86) PCT No.: PCT/EP97/06659

§ 371 Date: Sep. 17, 1999

§ 102(e) Date: Sep. 17, 1999

(87) PCT Pub. No.: WO98/28541

PCT Pub. Date: Jul. 2, 1998

(30) Foreign Application Priority Data

Dec. 21, 1996 (DE) .............................................. 196 53 895

(51) Int. Cl.$^7$ .................................................. F04B 39/00
(52) U.S. Cl. .............................................................. 417/454
(58) Field of Search ..................................... 417/454, 503, 417/541, 415, 571, 470, 547; 303/119.2, 116.1, 113.2, 113.4; 137/112

(56) References Cited

U.S. PATENT DOCUMENTS

| | | | |
|---|---|---|---|
| 5,465,817 | * 11/1995 | Muscatell | 188/295 |
| 5,865,213 | * 2/1999 | Schffel | 137/614.16 |
| 5,887,956 | * 3/1999 | Rausch | 303/119.2 |
| 5,918,949 | * 7/1999 | Volz et al. | 303/115.4 |
| 5,944,498 | * 8/1999 | Wupper et al. | 417/454 |
| 5,971,501 | * 10/1999 | Hosoya | 303/119.2 |
| 5,984,651 | * 11/1999 | Beck et al. | 417/503 |

* cited by examiner

Primary Examiner—Teresa Walberg
Assistant Examiner—Vinod D Patel
(74) Attorney, Agent, or Firm—Rader, Fishman & Grauer PLLC

(57) ABSTRACT

In a pump with a pump housing which includes at least one working chamber and a valve bore connected to the working chamber and wherein an inlet valve and an outlet valve are arranged one behind the other, and with a displacement element that is adapted to reciprocate and, by its movement, varies the volume of the working chamber, the valve sea, the closing element and a valve spring of the inlet valve or the outlet valve which presses the closing element against the valve seat, are interconnected to provide a cartridge which can be installed into the valve bore so as to seal, and the cartridges of both valves are installed from the same side into the valve bore and are supported in the installation direction on the pump housing by a step in the valve bore.

12 Claims, 4 Drawing Sheets

PUMP, IN PARTICULAR FOR AN HYDRAULIC WHEEL-SLIP BRAKE CONTROL SYSTEM

TECHNICAL FIELD

The present invention generally relates to pumps and more particularly relates to pumps used in a hydraulic brake slip control system.

BACKGROUND OF THE INVENTION

In a pump of the above-mentioned type disclosed in German patent application No. 32 48 364, the inlet and outlet valves are configured as spherical seat valves, and the valve seat is respectively provided by a stepped expansion of the valve bore in the pump housing. Structural provisions for a simple manufacture of the valve bore and for an easy assembly and testing of the valves are not disclosed in the said application. The pump includes a piston as a displacement element which is guided and sealed in a cylinder bore that crosses the valve bore and is drivable by an eccentric in the pressure direction and by a spring in the suction direction.

German patent application No. 40 27 848 discloses a piston pump wherein the inlet valve and the outlet valve are respectively arranged in a separate stepped bore which is connected to the working chamber by way of a connecting bore. The inlet and outlet vales are provided by different valve inserts which comprise the stationary valve seat, the movable closing element and a valve spring. This prior art piston pump necessitates machining of the stepped bores and the installation of the valve inserts from opposite sides of the pump housing. This has unfavorable effects on manufacturing costs and implies a great restriction of the design possibilities of a constructor, for example, in terms of a structural integration of the pump housing in the housing of a valve block.

An object of the present invention is to provide a pump of the above-mentioned type which involves low efforts and expenditure in manufacture and assembly and can easily be integrated into the housing of a hydraulic unit.

According to the present invention, this object is achieved because the valve seat, the closing element and a valve spring of the inlet valve or the outlet valve, which spring presses the closing element against the valve seat, are interconnected to form a cartridge which is adapted to be sealedly installed into the valve bore, and the cartridges of both valves can be fitted from the same side into the valve bore and are adapted to be supported on the pump housing in the installation direction by means of a step in the valve bore. If the construction of the pump permits it, the cartridges of both valves may further be supported on each other. Besides, in a particularly simple embodiment of the present invention, the valve seat, the closing element and the valve spring of the inlet valve and outlet valve may be interconnected to form one single cartridge which can be sealedly inserted into the valve bore.

It is advantageous in the design of the pump according to the present invention that the valve bore can be fabricated in one single operation and, exactly as the assembly of the valves, can be effected from one side of the pump housing. Also, the assembly of the valves can be carried out in one single operation, provided their cartridges are not spaced from one another. This reduces the manufacturing costs and simplifies the accommodation of the pump in a housing provided for further structural elements. In addition, it is a special advantage that the valves in the preassembled cartridges can be tested prior to their installation so that defects of fabrication can be detected early and installation of defective parts can be avoided. If both valves, i.e., the inlet valve and the outlet valve, are accommodated in one joint cartridge, it is possible to remarkably reduce the number of the valve components and the mounting space required.

According to the present invention, the cartridge can be assembled of several parts. The cartridge may include a housing or a housing part made of a material of reduced rigidity, for example, aluminum or free cutting steel, which is connected to a valve seat ring made of a material of higher rigidity, for example, hardened steel. The cartridge may be retained and sealed in the valve bore in different fashions. One favorable type of attachment is caulking the cartridge into the valve bore. Preferably, the cartridge or the cartridges is/are inserted into the valve bore from the high-pressure side end so that the valves, in their closed position, are acted upon by the pump pressure in the installation direction in which they are supported on the pump housing by way of a step in the valve bore. The cartridges may be sealed metallically by correspondingly shaped seat surfaces or by means of ring seals. According to the present invention, a particularly favorable attachment and sealing can be achieved in that the end of the cartridge, which is the rear end when viewed in the installation direction, has a sleeve-type portion, and by pressing a plug into the sleeve-type portion, the latter is expandable and thereby adapted to be attached in the valve bore in operative and sealed engagement therewith.

When the pump has a damping chamber which succeeds the outlet valve, it is favorable that the cartridge is installed from the damping chamber. To fix the cartridge or the cartridges in the installation position, a compression spring can be used which is mounted into the damping chamber and is supported on the end of the cartridge that projects into the damping chamber.

DETAILED DESCRIPTION OF THE PREFERRED EMBODIMENTS

Figure 1:
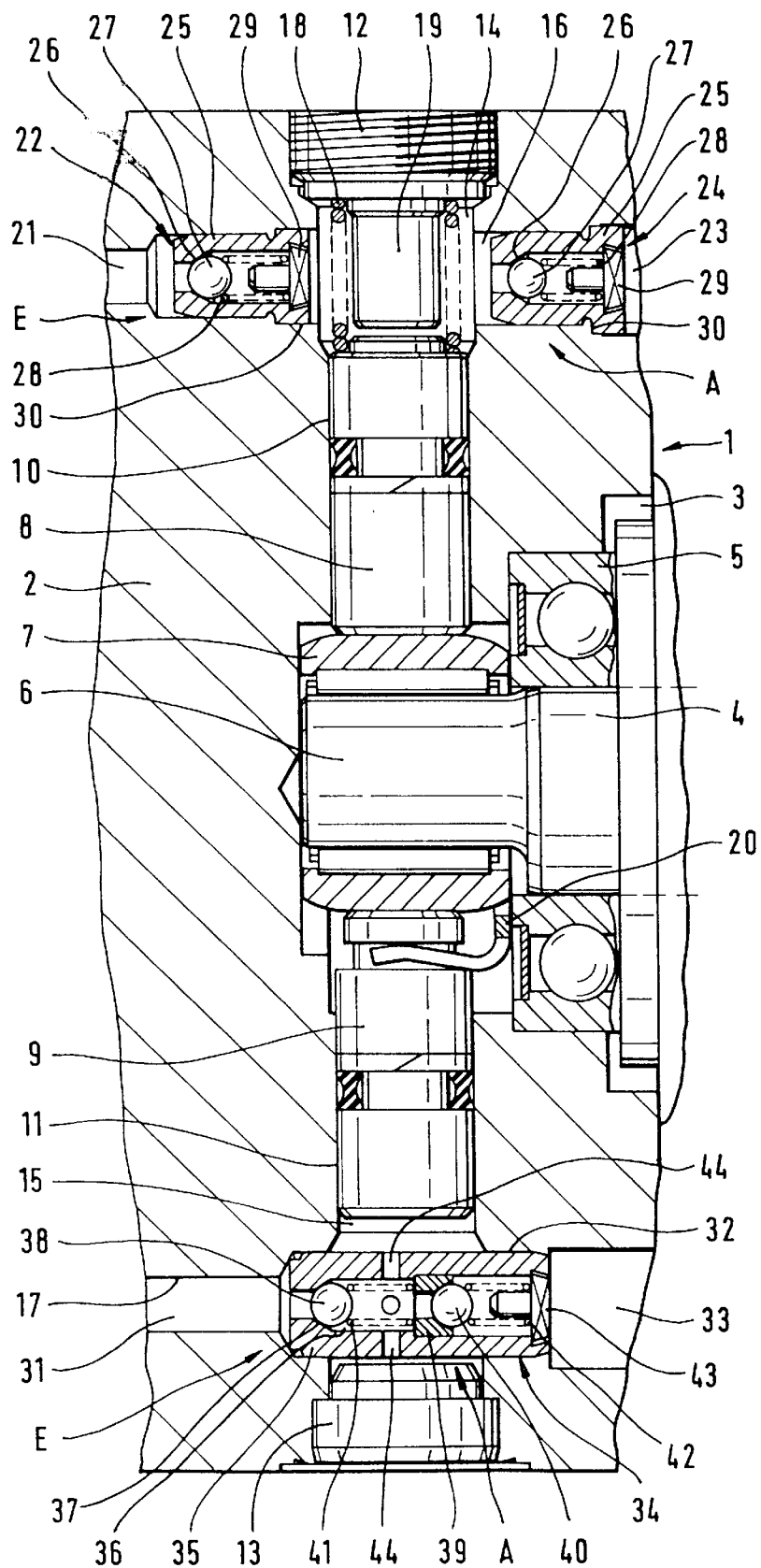
FIG. 1 is a cross-sectional view of a radial piston pump configured according to the present invention.

The radial piston pump 1 shown in FIG. 1 includes a pump housing 2 with a central bearing bore 3 in which a drive shaft 4 is pivotally mounted by way of a ball bearing 5. Provided on the drive shaft 4 is an eccentric 6 which drives two pistons 8, 9 by way of a needle bearing 7. The pistons 8, 9 are guided in cylinder bores 10, 11 arranged in a radial direction relative to the bearing bore 3. The radially outward bore ends are closed by plugs 12, 13. Between the pistons 8, 9 and the plugs 12, 13, the cylinder bores 10, 11 respectively form a working chamber 14, 15 which is penetrated by a valve bore 16, 17 that is in parallel or vertical to the bearing bore 3. The working chamber 14 houses a compression spring 18 which urges the piston 8 against the needle bearing 7 and effects the suction stroke of the piston 8. The compression spring 18 is guided on a pivot 19 of the plug 12 which extends into the working chamber 14. The suction stroke of the piston 9 is effected by a resilient coupling ring 20 which is supported on the needle bearing 7 and presses the piston 9 against said's outside ring.

An inlet valve E is arranged in the valve bore 16 between the working chamber 14 and the bore portion 21 leading to a low-pressure chamber, and an outlet valve A is interposed between the working chamber 14 and a bore portion 23 which leads to a high-pressure chamber. Both valves E, A are equally configured as cartridges 22, 24 and comprise a sleeve-shaped housing 25 having a bore which forms a valve seat 26 and includes a valve ball 27, a valve spring 28 and a valve plate 29 with a spring guide pin. The valve plate 29 is secured by caulking in the bore of housing 25 and has at its edge segment-shaped recesses for the provision of pressure fluid passages. At its end which is the rear end in the installation direction, the cylindrical peripheral surface of the housing 25 has a collar 30 of a slightly larger diameter which is supported in an axial direction on a correspondingly shaped step of the valve bore 16.

To be able to install the inlet valve E from the same side as the outlet valve A into the valve bore 16, the housing 25 of the cartridge 24 and the bore portion 23 of the valve bore 16 have a correspondingly larger diameter. During the assembly, the cartridges 22, 24 are one after the other pressed into the bore portion 21 or 23, and the collar 30 digs with its front edge into the bore step and provides a metallic sealing of the housing 25 in the pump housing 2.

The valve bore 17 is subdivided by two steps into three portions 31, 32, 33 of different diameters. Portion 31 has the smallest diameter and is positioned on the low-pressure side. A cartridge 34 which comprises an inlet valve E and an outlet valve A is inserted into portion 32 which extends through the working chamber 15. Cartridge 34 includes a sleeve-shaped housing 35 which abuts with a frontal sealing edge on the step leading to portion 31. The housing 35 is caulked in the pump housing 2 at the step leading to portion 33. Housing 35 has a bore 36 stepped several times which, at one end, provides a valve seat 37 for a valve ball 38 of the inlet valve E. At a distance from valve ball 38, a hardened valve seat ring 39 is pressed into the bore 36 which is closable by a valve ball 40 and, along with it, forms outlet valve A. A valve spring 41 is compressed between the valve ball 38 and the valve seat ring 39. A second valve spring 42 is supported on the valve ball 40 and a spring plate 43 attached in the bore 36. In-between the valve ball 38 and the valve seat ring 39, the bore 36 is connected to the working chamber 15 by way of a plurality of radial bores 44.

FIGS. 2 to 7 show a portion of a housing 45 of a hydraulic unit for a brake slip control system. The portion of the housing 45 comprises a piston pump 46 and a damping chamber 47 which is used to dampen the pulsation of the high-pressure side delivery flow of the piston pump 46. The damping chamber 47 which is provided by a cylindrical housing bore is closed outwardly by a cover 48 retained by a circlip 49. A valve bore 50 leads from the damping chamber 47 to a working chamber 51 of the piston pump 46 and from there further on to a low-pressure port. The working chamber 51 is formed by a housing bore 52 which is vertical relative to the valve bore 50 and is closed outwardly by a plug 53 caulked with the housing 45. A piston 54 slides in the inwardly disposed portion of the housing bore 52 which is movable by an eccentric drive (not shown in detail) similarly as the piston 9 of the radial piston pump 1 shown in FIG. 1. The inlet valve E and the outlet valve A are installed as a prefabricated cartridge through the damping chamber 47 into the valve bore 50 prior to the assembly of the cover 48.

Figure 2:
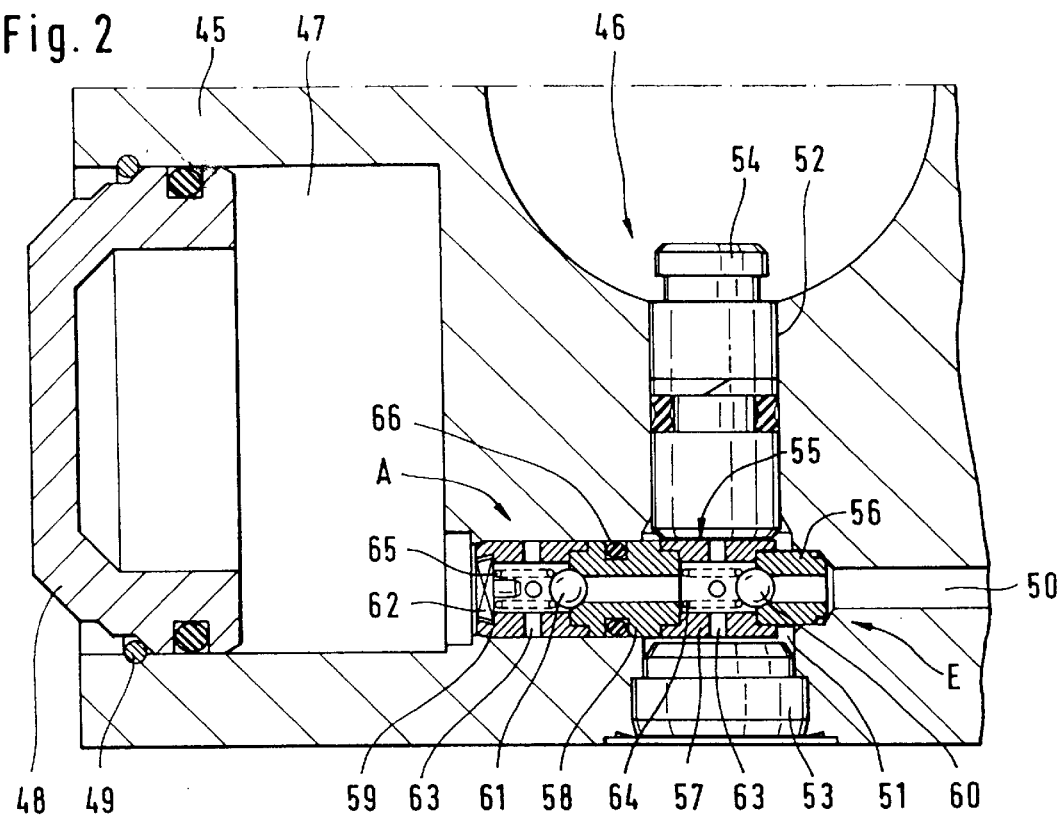
FIG. 2 is a partial cross-sectional view of a radial piston pump of the present invention which is incorporated into the housing of a hydraulic unit.

The cartridge 55 is set up of four cylindrical sleeves 56, 57, 58, 59 in the embodiment of FIG. 2. The sleeves 56 and 58 are made up of hardened steel, and each forms a valve seat for a valve ball 60, 61. The sleeves 57 and 59 are made of aluminum and have equal dimensions. They include recesses on their frontal ends into which the sleeves 56, 58 with correspondingly shaped portions, or a spring plate 62, are inserted. The sleeves 57, 59 include a plurality of radial bores 63 in their middle. The diameter of the longitudinal bore of the sleeves 57, 59 is larger than that of the valve ball 60, 61 to permit flow of the pressure fluid around the valve balls 60, 61 when the valves are open. Valve springs 64, 65 urge the valve balls 60, 61 against the valve seats. The cartridge 55 is fixed in its installation position by caulking the end of the sleeve 59 which faces the damping chamber 47. Sealing in the valve bore 50 is effected by a sealing edge of the sleeve 56 which is pressed on a bore step, and by a ring seal 66 arranged in a groove in the peripheral surface of the sleeve 58.

Figure 3:
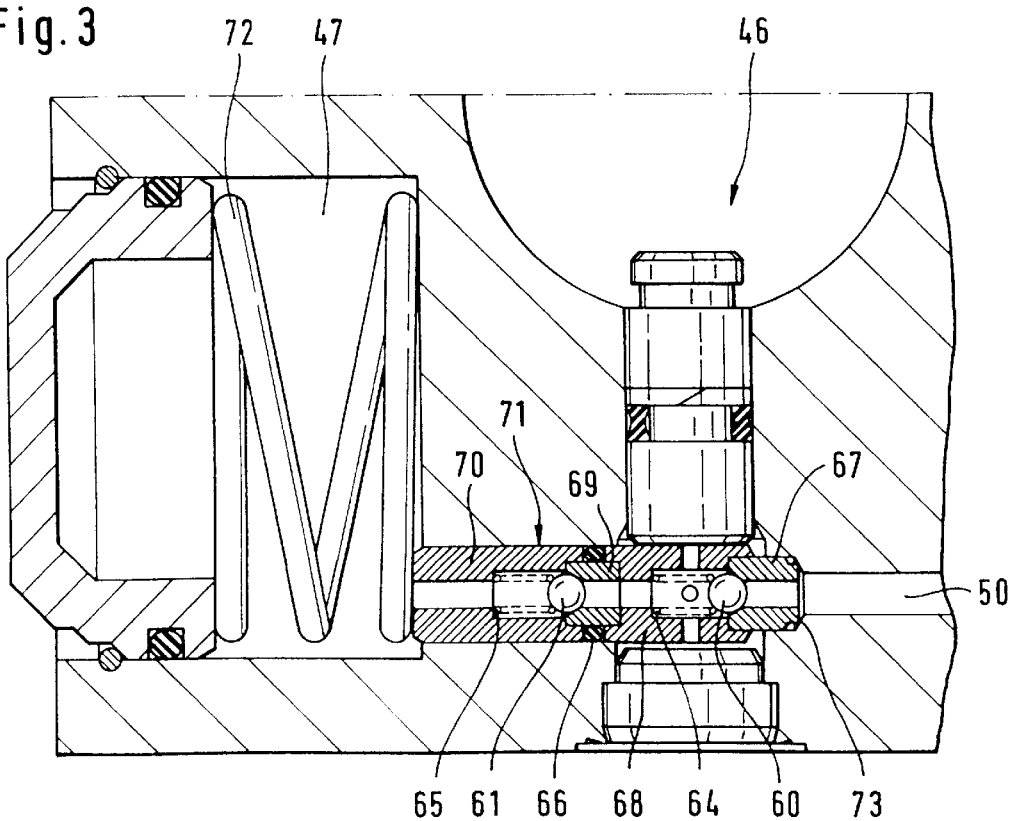
FIGS. 3 to 7 show partial cross-sectional views of the radial piston pump according to FIG. 2 with different embodiments of the cartridges which form the inlet and outlet valves.

FIG. 3 shows another embodiment of a cartridge 71 composed of four sleeves 67, 68, 69, 70. The sleeves 67, 69 again are made of hardened steel and the sleeves 68, 70 are made of aluminum or free cutting steel. Two sleeves 67, 68 and 69, 70 each form the housing of an inlet or outlet valve with a valve ball 60 or 61 and valve spring 64 or 65 arranged therein. To seal the cartridge 71 in relation to the valve bore 50, in turn, there is provision of a sealing edge on the sleeve 67 and a ring seal 66, and the annular groove to accommodate the ring seal 66 is formed by the peripheral surface of the sleeve 69 and the end surface of the sleeves 68 and 70. The cartridge 71 is retained in an axial direction by a compression spring 72 arranged in the damping chamber 47. Spring 72 is supported on the end of the sleeve 70 which projects into the damping chamber 47 and urges the cartridge 71 with its sleeve 67 against the step 73 in the valve bore 50.

Figure 4:
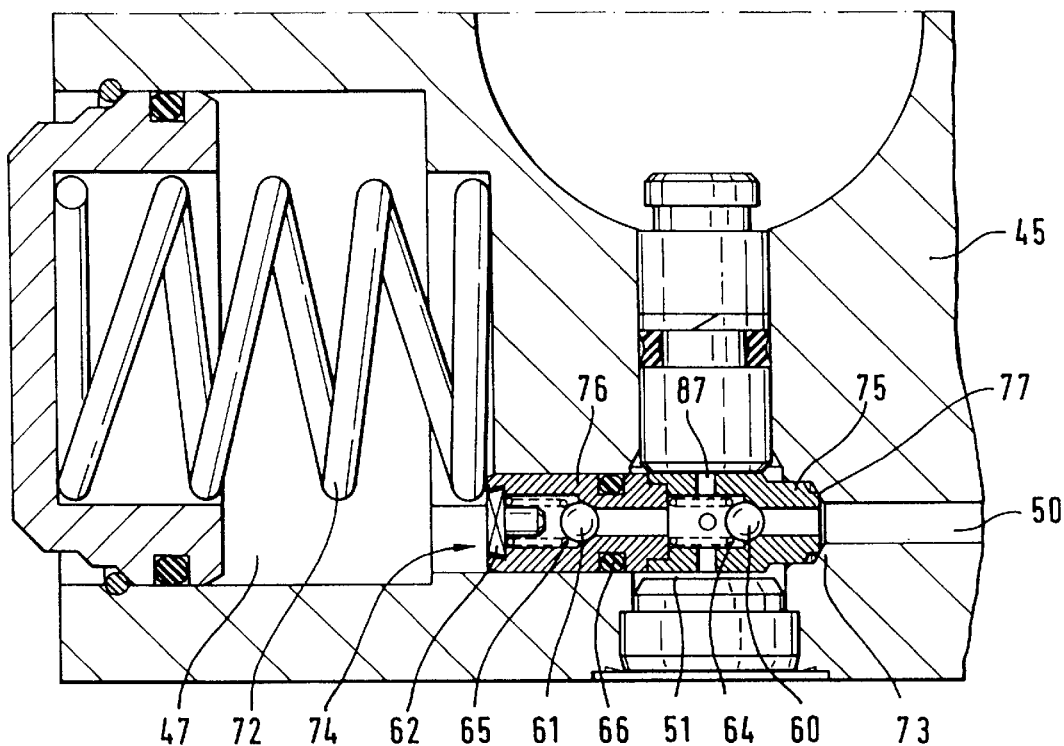

The housing of the cartridge 74 shown in the FIG. 4 embodiment is only composed of two sleeves 75, 76, each having a stepped sleeve bore to form a valve seat. On its frontal end, the sleeve 75 with a sealing edge 77 is supported on the step 73 of the valve bore 50 and sealed metallically. Its sleeve bore is connected to the working chamber 51 by radial bores 78. Sleeve 76 engages with a projection into a recess of the sleeve 75 and may thereby be operatively connected to the sleeve 75 to provide a structural unit already prior to its installation into the valve bore 50. The valve spring 64 is compressed between the valve ball 60 and the sleeve 76. The valve spring 65 is compressed between the valve ball 61 and a spring plate 62 attached in the bore of the sleeve. A ring seal 66 is again provided to seal the sleeve 76 in relation to the valve bore 50. In this embodiment, too, the cartridge 74 is fixed in its installation position by a compression spring 72 placed in the damping chamber 47.

Figure 5:
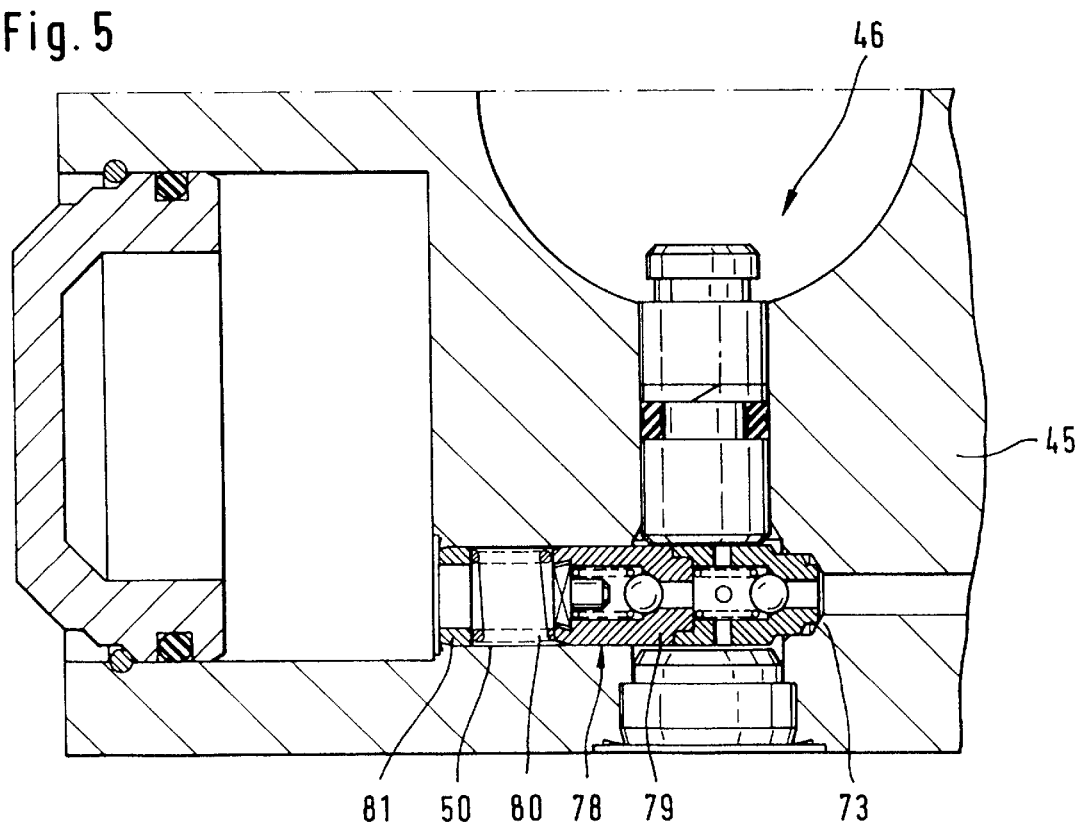

The cartridge 78 of the embodiment of FIG. 5 differs from the cartridge 74 merely by the fact that the ring seal 66 and the associated ring seal groove in the sleeve 79, which is the rear one in the installation direction, are eliminated, with the result of a smaller axial overall length. To achieve a sufficient sealing on the high-pressure side, the outside diameter of the sleeve 79 and the associated portion of the valve bore 50 have a transition fit. A small leakage which is still possible to occur in this arrangement is tolerable. The cartridge 78 is pressed against the step 73 of the valve bore 50 by a compression spring 80 which is supported on a ring 81 caulked into the valve bore 50.

Figure 6:
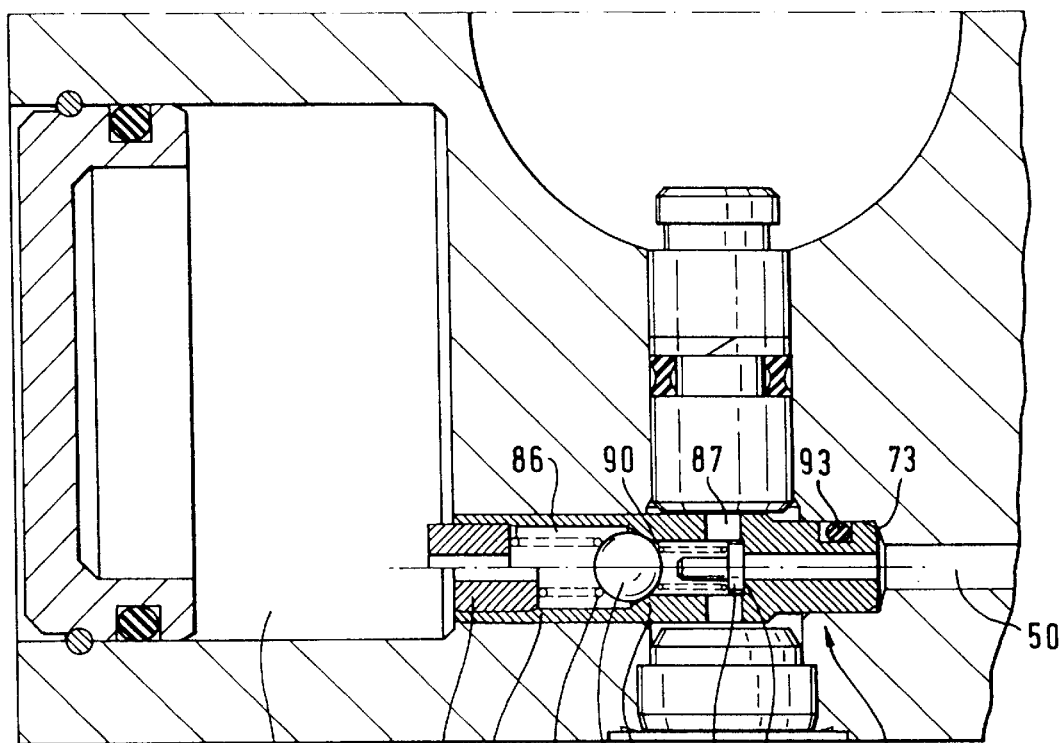

In the embodiment shown in FIG. 6, the housing of the cartridge 82 is made up of one single sleeve 83 which accommodates the inlet valve E and the outlet valve A. To this end, sleeve 83 comprises a sleeve bore 86 which expands in steps forming two valve seats 84, 85 from the low-pressure side to the high-pressure side The mid-portion of the bore 86 is connected to the working chamber 51 by way of a transverse bore 87. Associated with the valve seat 84 is a valve plate 88, and associated with the valve seat 85 is a valve ball 89. Compressed between the valve plate 88 and the valve ball 89 is a weak valve spring 90, and a more potential valve spring 92 is compressed between the valve ball 89 and the plug 91 which is pressed into the end of the sleeve bore 86 close to the damping chamber 47. On the low-pressure side, the sleeve 83 can be sealed in the valve bore 50 by means of a ring seal 93 (top half of drawing) or also metallically without a ring seal (bottom half of drawing). The sealing on the high-pressure side is carried out by pressing the plug 91 into the sleeve bore 86, and in doing so, the sleeve portion encompassing the plug 91 is slightly expanded and urged metallically so as to seal against the wall of the valve bore 50. In addition, the cartridge 82 is operatively attached in the valve bore 50 by pressing in of the plug 91. Due to the axial force component which acts upon the sleeve 83 when the plug 91 is pressed in, further, a metallic sealing is achieved between the low-pressure side end surface of the sleeve 83 and the plug 73 of the valve bore 50. The plug 91 can be pressed in either with stop (bottom half of drawing) or without stop (top half of drawing).

Figure 7:
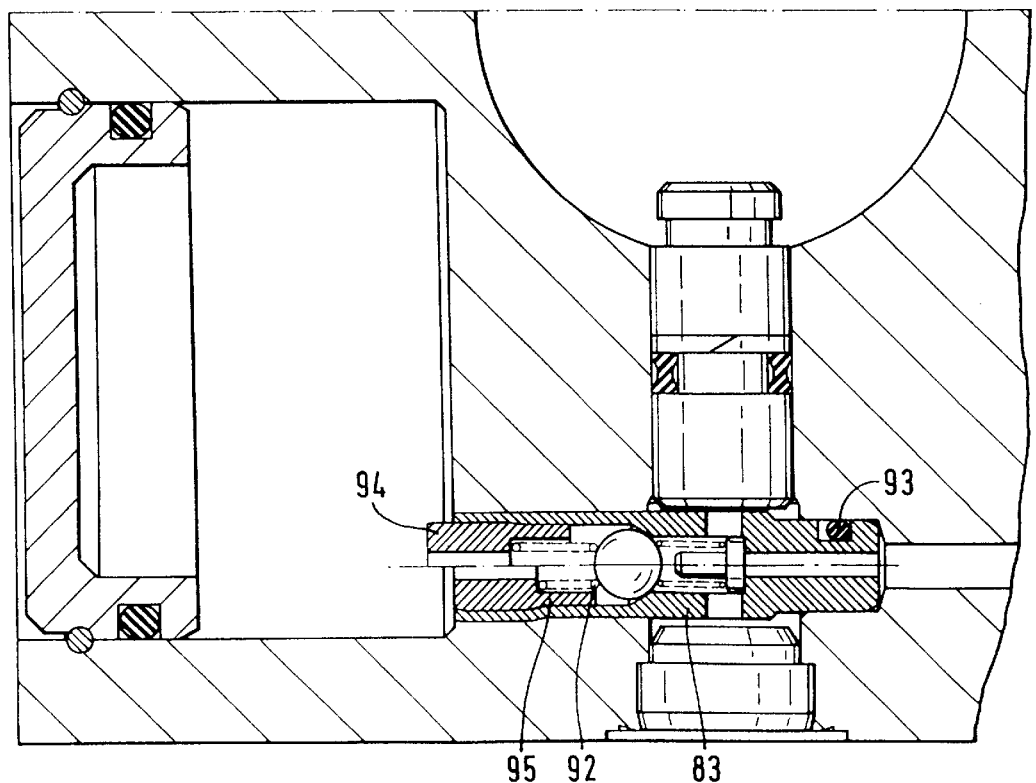

The embodiment of FIG. 7 distinguishes from the embodiment of FIG. 6 only by the differing configuration of the plug 94 which, in contrast to plug 91, has a neck portion 95 in which the valve spring 92 is guided.

Above all, the embodiments described are characterized by a simple manufacture, preassembly, and installation of the inlet and outlet valves into the housing. Both valves may be installed from one side of the housing, so that the design of the pump housing is also simplified. The valves configured as cartridges require only a small mounting space and can extend into the working chamber, whereby the clearance volume of the working chamber is decreased and the self-venting of the pump is improved. The cartridge configuration further permits ease of testing the complete valve unit prior to the installation It is further especially appropriate for a simple and durable metallic sealing in the pump housing. Still further, as show especially the one-part and two-part cartridge housing designs, the number of the component parts and, thus, the costs incurred for manufacture and assembly of the valves may be reduced.

What is claimed is:

1. Pump, for use in a hydraulic brake slip control system, comprising:

a pump housing which includes at least one working chamber and a valve bore connected to the working chamber wherein an inlet valve and an outlet valve with each one stationary valve seat and a movable closing element are arranged one behind the other, a displacement element that is adapted to reciprocate and, by its movement, varies the volume of the working chamber, wherein the valve seat, the closing element and a valve spring of the inlet valve or the outlet valve, which spring presses the closing element against the valve seat, are interconnected to form a cartridge which is adapted to be installed into the valve bore so as to seal, and in that the cartridges of both valves can be fitted from the same side into the valve bore and are adapted to be supported on the pump housing in the installation direction by means of a step in the valve bore.

2. Pump as claimed in claim 1, wherein the cartridges of both valves are supported on each other.

3. Pump as claimed claim 1, wherein the valve seat, the closing element and the valve spring of the inlet valve and the outlet valve are interconnected to form one single cartridge.

4. Pump as claimed claim 1, wherein the cartridge includes a housing or a housing part made of a material of reduced rigidity, and wherein the housing or housing part is connected to a valve seat and is made of a material of higher rigidity.

5. Pump as claimed claim 1, wherein the cartridge is retained and sealed in the valve bore in a snug fit.

6. Pump as claimed claim 1, wherein the cartridge is retained and sealed by caulking in the installation opening of the valve.

7. Pump as claim 1, wherein the cartridge or the cartridges are inserted into the valve bore from the high-pressure side bore end and are supported on the pump housing by way of a step in the valve bore.

8. Pump as claimed claim 1, wherein the end of the cartridge, which is the rear end when viewed in the installation direction, has a sleeve-type portion, and in that by pressing a plug into the sleeve-type portion the latter is expandable and thereby adapted to be attached in the valve bore in operative and sealed engagement therewith.

9. Pump as claim 1, wherein the cartridge is retained in the valve bore by a compression spring.

10. Pump as claimed in claim 9, wherein the compression spring is supported on a ring that is caulked into the valve bore.

11. Pump as claimed in claim 10, wherein the pump housing has a damping chamber which is adjacent to the outlet valve, and in that the cartridge is inserted through the damping chamber into the valve bore.

12. Pump as claimed in claim 11, wherein the cartridge is fixed in the installation position by a compression spring which is supported on the end of the cartridge which projects into the damping chamber.

* * * * *